United States Patent [19]

Bosserman et al.

[11] Patent Number: 4,980,139

[45] Date of Patent: Dec. 25, 1990

[54] METHOD FOR REMOVING CHLORINE FROM A GAS STREAM

[75] Inventors: Paula J. Bosserman, Riverside; Morton M. Wong, Placentia, both of Calif.

[73] Assignee: Union Oil Company of California, Los Angeles, Calif.

[21] Appl. No.: 486,072

[22] Filed: Feb. 28, 1990

[51] Int. Cl.$^5$ .................. B01D 53/04; C01B 7/01; C01F 17/00

[52] U.S. Cl. ........................... 423/241; 55/71; 423/21.1; 423/263

[58] Field of Search ............ 423/21.1, 263, 241; 55/71, 22

[56] References Cited

U.S. PATENT DOCUMENTS 3,812,233  5/1974  Duncan .......................... 423/21.1
4,355,015 10/1982  Heckel et al. ...................... 423/241
4,561,959 12/1985  Janoski et al. ...................... 423/241
4,857,296  8/1989  Brunelle et al. ................... 423/21.1

OTHER PUBLICATIONS

Kirk–Othmer, "Encyclopedia of Chemical Technology", John Wiley and Sons, New York, N.Y., vol. 5, 1979, pp. 317–318.

*Primary Examiner*—Jeffrey E. Russel
*Assistant Examiner*—Brian M. Bolam
*Attorney, Agent, or Firm*—Clark E. De Larvin; Gregory F. Wirzbicki

[57] ABSTRACT

Chlorine is removed from a gas stream by contacting the stream with a pulverized, oxidized bastnasite ore in the presence of water. The invention is particularly applicable to the processing of bastnasite ore for the recovery of rare earth compounds wherein there is produced a waste gas stream containing chlorine.

38 Claims, No Drawings

METHOD FOR REMOVING CHLORINE FROM A GAS STREAM

The present invention broadly relates to a method of removing chlorine from a gas stream containing the same utilizing a bastnasite ore. It particularly relates to a method of treating a waste gas stream produced in a process wherein a bastnasite ore is processed to produce rare earth elements or compounds thereof and further provides for the elimination of a waste stream produced in such a process.

BACKGROUND

Though over 100 minerals are known to contain the rare earth or lanthanide elements, only a few provide the bulk of the world source of these elements. The principal rare earth-containing mineral monazite, is recovered by gravity, magnetic, electro static, and flotation concentration methods. The principal rare earth source mineral in the United States is bastnasite ($LnFCO_3$). Initial processing of bastnasite comprises crushing the ore, and then using a flotation process to separate the source associated quartz, barite, calcite and strontianite. The flotation process yields an ore concentrate containing up to about 60 weight percent rare earth calculated as rare earth oxides. The concentrate then is leached with dilute hydrochloric acid to remove some of the alkaline earth constituents. This produces a concentrate having a rare earth oxide value of approximately 70 weight percent.

The ore is next roasted in an oxidizing atmosphere to convert the fluorocarbonate mineral contained therein to an oxide. It also oxidizes the cerium to a tetravalent state, which is essential to the subsequent separation of cerium from the other rare earths. Typically, the roasting is accomplished in an oxidizing atmosphere at an elevated temperature.

The roasted ore is then leached with a dilute acid. In this leach the non-cerium rare earths are solubilized. The cerium oxide is nominally insoluble in dilute HCl; thus the two are readily separated. The soluble oxides of the rare earths are transferred to a solvent extraction facility for their separate recovery.

The insoluble residue remaining from the foregoing acid leach is contacted in a closed reactor with a concentrated hydrochloric acid which solubilizes the cerium oxide for later recovery in a high purity form. During this step, the cerium concentrate is typically contacted with a 50 weight percent hydrochloric acid which, in addition to dissolution of cerium oxide, produces chlorine which is purged from the reactor. The chlorine comprises a waste stream which is scrubbed with a sodium hydroxide solution to prevent environmental contamination. The scrubbing solution is converted to a sodium chloride containing solution. Thus, the chlorine is converted from a hazardous waste gas to a less hazardous aqueous waste. Moreover, this process requires a substantial expense for sodium hydroxide plus produces a liquid waste.

SUMMARY OF THE INVENTION

Broadly the present invention comprises a method of removing chlorine from a gas stream containing the same. The method comprises contacting the gas stream with a pulverized, oxidized bastnasite ore in the presence of water for a time sufficient to react with a substantial amount of the chlorine.

A particularly preferred application of the present invention is to a process in which a bastnasite ore is processed to produce rare earth compounds and in which there is produced a gas stream containing chlorine. It has been found that the pulverized roasted (oxidized) ore, when combined with water, makes an effective scrubbing reactant for chlorine gas. Another advantage of the invention is that the solids content of the slurry used for scrubbing the chlorine can be recycled to an upstream portion of the bastnasite ore process for recovery of the rare earth compounds contained therein. The solids in the used slurry will be substantially depleted in alkaline earth constituents which would otherwise require acid leaching to remove. Thus, the present invention eliminates (or minimizes) the need for purchasing expensive reagents such as sodium oxide or hydroxide. Further it can also eliminate (or minimize) the waste stream that would be produced through the use of a sodium hydroxide scrubbing solution. In addition, it can substantially reduce the acid requirements in one of the upstream ore processing steps.

DESCRIPTION OF A PREFERRED EMBODIMENT

For convenience the present invention will be described with reference to what is now considered its most preferred application, namely, the removal of chlorine from a waste gas stream produced in the processing of a bastnasite ore for the production of rare earth compounds. The bastnasite ore typically comprises from about 5 to 8 and typically about 6 weight percent rare earth calculated as rare earth oxides (rare earth value of 6%). The balance comprises what are considered impurities such as the associated quartz, barite, calcite and strontianite. The ore is pulverized and ground to a size that will pass through a 100 mesh screen. Typically, the particle size is within the range of from about 1 to 100 microns and preferably within the range of from about 5-25 microns.

The ground ore is subjected to a flotation process to separate a substantial amount of impurities from the rare earth compounds. Typically, during the flotation process the bastnasite is separated from its associated minerals such as quartz, barite, calcite and strontianite. This process produces a concentrate comprising about 60 weight percent rare earth calculated as rare earth oxides.

The concentrate is then subjected to a first acid leach with a dilute hydrochloric acid (pH about 1.0) to remove some of the alkaline earth constituents of the concentrate. This produces an enriched concentrate comprising approximately 70 weight percent rare earths calculated as rare earths oxides (REO).

The enriched concentrate is then roasted typically at a temperature within the range of from about 400° C. to about 800° C. in the presence of air. The roasting step converts the flurocarbonate mineral to an oxide and oxidizes the cerium content to its tetravalent state. The roasting step also oxidizes most of the remaining alkaline earth constituents to their corresponding oxides. A typical roasted ore will comprise the oxides of strontium, calcium, barium and magnesium, for example in concentrations of at least about 0.5, 7.0, 5.0 and 1.0 weight percent respectively.

The roasted ore is then subjected to a second acid leach, this time with a stronger acid. Typically, this second leach utilizes approximately a 0.1 to 0.5N and preferably about a 0.2N hydrochloric acid. The purpose of this leach is to remove the remaining alkaline earth constituents and to separate the cerium from the other rare earth oxides. The cerium is recovered as an insoluble residue while the solubilized rare earths are removed and sent to a separate solvent extraction facility for recovery.

The insoluble residue from the second acid leach is then subjected to solubilization in a third acid leach with a concentrated hydrochloric acid solution. Typically, a solution comprising 50 weight percent hydrochloric acid in water is utilized. During this step, chlorine gas is evolved and purged from the reactor with a stream of air. To prevent atmospheric pollution, the chlorine-containing gas must be treated for chlorine removal.

In accordance with the present invention, it has been found that the pulverized, roasted (oxidized) bastnasite can be contacted with the chlorine-containing gas in the presence of water for a time sufficient to effect the removal of at least 25% and preferably 40% of the chlorine from the gas stream.

The contact can be accomplished by passing the chlorine-containing gas stream through a packed bed of wetted ore. The most preferred and effective method is to form an aqueous slurry of the ore. The chlorine-containing gas then is passed through a scrubbing tower where it is contacted with the aqueous slurry. Typically, the slurry will comprise from 25 to 90 weight percent ore and preferably, from about 40 to 70 weight percent ore. In laboratory experiments, particularly good results have been obtained using a slurry comprising 50 weight percent ore and 50 weight percent water.

The amount of contact time will vary widely depending upon such variables as the size of the ore, the amount of chlorine removal required, the weight ratio of ore to water and the degree of contact between the scrubbing slurry and gas in the apparatus utilized. However, having selected those variables an optimum time is readily determinable. Typically, to remove in excess of 90 percent of the chlorine a time of from about 0.1 to 10 minutes is required depending upon the apparatus and concentration of ore in the slurry. When using a scrubbing tower in which the ore has a size smaller than 50 microns and the slurry is recirculated, a contact time within the range of from about 0.1 to 1.0 minute will provide for a chlorine removal of in excess of about 80 percent.

An advantage of using a wet scrubber and a slurry of ore and water as a scrubbing solution is that the spent scrubbing solution does not become a waste stream as is the case when sodium compounds are used. In the process of scrubbing chlorine, the alkaline earth constituents are solubilized by the chlorine. The amount of alkaline earth constituents removed form the ore will be a function of, among other things, the concentration of chlorine in the gas stream, contact time and the weight percent of ore in the slurry. Typically in excess of 20 weight percent and generally in excess of 30 weight percent of the total alkaline earth constituents can be solubilized and leached from the ore. It has been discovered that in accordance with the method of this invention the proportion of calcium, magnesium and strontium removed is at least 7%, 5%, and 65%, respectively.

The solids content of the slurry is still rich in rare earth values. By recycling the slurry or its solids content to the bastnasite ore process, the rare earth values are recoverable and significantly less acid is required for removal of its alkaline earth constituents. Typically, the spent slurry would be recycled to the second acid leaching step. By such recycle the amount of acid required in the second acid leach step is reduced compared to that which would be required in the absence of the present invention.

While the present invention provides an economical method of removing chlorine from a waste gas stream, using a pulverized, oxidized ore, it may also be combined with a conventional caustic scrubber. There may be instances where it is economically advantageous to treat the chlorine containing gas stream in accordance with the present invention for removal of, for example, 40 to 80 percent of the chlorine. The gas stream from this treatment could then be introduced into a conventional caustic scrubber and contacted with an aqueous sodium hydroxide solution to remove a substantial portion or substantially all of the remaining chlorine. This two step scrubbing could be particularly advantageous when removal of substantially in excess of 90 percent of the chlorine is required. When this two step treatment is utilized there is still a substantial reduction in the amount of sodium hydroxide required and a corresponding reduction in the amount of liquid waste produced. It also is within the scope of the present invention to include another reactant for chlorine in the ore-water slurry.

EXAMPLE

To test the effectiveness of roasted bastnasite for the removal of chlorine, the following test was performed. Three scrubbing towers were connected in series. The first tower contained a slurry of equal weights of pulverized, roasted bastnasite and water. The second and third towers contained a 1N sodium hydroxide solution. The second and third towers were used to trap any chlorine that was not trapped by the first tower containing the roasted bastnasite. Chlorine was bubbled through the towers serially at a rate such that the contact time in each towers was within the range from about 1 to 5 seconds. The results are summarized in Table 1 below.

TABLE 1

| Tower | Composition | Chlorine Removed (Percent of Total) |
| --- | --- | --- |
| 1 | 50 weight % roasted bastnasite in water | 43 |
| 2 | 1 M NaOH | 44 |
| 3 | 1 M NaOH | 13 |

During the chlorine removal a substantial amount of the alkaline earth values of the ore are solubilized. The measured amounts of alkaline earth solubilized are summarized in Table 2. For purposes of comparison the amount of alkaline earth naturally soluble in the slurry in the absence of chlorine is included.

TABLE 2

USE OF WASTE CHLORINE TO LEACH ALKALINE EARTHS FROM ROASTED BASTNASITE PRODUCTS

| Alkaline Earth | Percent of Total Leached by Chlorine | Percent of Total Leached Without Chlorine (blank) |
| --- | --- | --- |
| Calcium | 10.0 | 0.01 |
| Magnesium | 7.3 | 0.02 |
| Strontium | 76.8 | 0.20 |

TABLE 2-continued

USE OF WASTE CHLORINE TO LEACH ALKALINE EARTHS FROM ROASTED BASTNASITE PRODUCTS

| Alkaline Earth | Percent of Total Leached by Chlorine | Percent of Total Leached Without Chlorine (blank) |
|---|---|---|
| Barium | 0.08 | <0.01 |

This clearly shows that, when this ore is recycled to the up-stream bastnasite ore process, substantially less acid will be required for leaching this ore, thus reducing the overall acid requirements for the process.

It is believed that the foregoing example clearly demonstrates the efficacy of the present invention to use the pulverized, oxidized ore from a bastnasite ore processing system to remove chlorine produced in that process. It further demonstrates that the invention provides means by which the sodium hydroxide requirement in the chlorine scrubbing tower is substantially reduced if not eliminated. It also demonstrates that it is possible to achieve a substantial reduction in the production of waste water and a concurrent reduction in waste disposal cost. Indeed, the present invention converts what would otherwise be a waste stream into an integral part of the bastnasite upgrading process.

While certain specific means of contact and contact times along with other data have been given for purposes of illustration, the invention obviously is not limited thereto. Numerous changes in the exact manner and performance of the steps of the present invention may be made by those skilled in the art, which changes are encompassed within the scope and spirit of the invention as defined by the appended claims.

What is claimed is:

1. A method of removing chlorine from a gas stream containing the same comprising: contacting the gas stream with a pulverized, oxidized bastnasite ore in the presence of water.

2. The method of claim 1 wherein the gas stream is contacted with an aqueous slurry of the ore.

3. The method of claim 2 wherein the aqueous slurry comprises from 25 to 90 weight percent ore.

4. The method of claim 2 wherein the aqueous slurry comprises about 40 to 70 weight percent ore.

5. The method of claim 1 wherein the gas stream is contacted for a time sufficient to remove in excess of 25% of the chlorine.

6. The method of claim 5 wherein the time is within the range of from about 0.1 to 1.0 minute.

7. The method of claim 1 wherein the ore is composed of particles having a particle size ranging from about 1 to 100 microns.

8. The method of claim 4 wherein the gas stream is subsequently contacted with a sodium hydroxide solution to remove substantially all of the remaining chlorine.

9. The method of claim 1 wherein the ore is obtained from a flotation process in which the bastnasite ore is separated from its associated impurities and then roasted in the presence of air.

10. The method of claim 2 wherein the ore also contains alkaline earth constituents and at least a portion of the alkaline earth constituents are solubilized during contact with the gas stream.

11. A method of removing chlorine from a waste gas stream containing the same, which gas stream is produced in the processing of bastnasite ore for the production of rare earth compounds comprising: contacting the gas stream with an aqueous slurry of pulverized, oxidized bastnasite ore for a time sufficient to remove a substantial portion of the chlorine from the waste gas stream.

12. The method of claim 11 wherein the ore in the slurry after contact with the waste gas stream is returned to the bastnasite ore process for recovery of the rare earth compounds contained therein.

13. The method of claim 11 wherein the aqueous slurry comprises from 25 to 90 weight percent ore.

14. The method of claim 12 wherein the aqueous slurry comprises about 40 to 70 weight percent ore.

15. The method of claim 13 wherein the gas stream is contacted for a time sufficient to remove in excess off 80 percent of the chlorine.

16. The method of claim 15 wherein the time is within the range of from about 0.1 to 1.0 minute.

17. The method of claim 13 wherein the ore has a particle size of from about 5 to 25 microns.

18. The method of claim 17 wherein the gas stream is subsequently contacted with a sodium hydroxide solution to remove substantially all of the remaining chlorine.

19. The method of claim 12 wherein the ore is obtained from a flotation process in which the ore is separated from its associated impurities and then roasted in an oxidizing atmosphere.

20. A method of removing chlorine from a waste gas stream produced by the acidification of a pulverized, oxidized bastnasite ore with a concentrated hydrochloric acid comprising: contacting the gas stream with an aqueous slurry of pulverized, oxidized bastnasite ore, obtained prior to the acidification, for a time sufficient to remove a substantial portion of the chlorine from the gas stream.

21. The method of claim 20 wherein the pulverized, oxidized ore contains alkaline earth constituents, at least a portion of which are solubilized during contact with the gas stream.

22. The method of claim 21 wherein the ore is obtained from a flotation process in which the ore is separated from its associated impurities and then roasted in an oxidizing atmosphere.

23. The method of claim 20 wherein the ore has a particle size of from about 1 to 100 microns.

24. The method of claim 23 wherein the aqueous slurry comprises from 40 to 70 weight percent ore.

25. The method of claim 23 wherein the aqueous slurry comprises about 50 weight percent ore.

26. The method of claim 25 wherein the gas stream is contacted for a time sufficient to remove from about 40 to 80 percent of the chlorine.

27. The method of claim 26 wherein the time is within the range of from about 0.1 to 1.0 minute.

28. The method of claim 20 wherein the slurry comprises about 40 to 70 weight percent ore.

29. The method of claim 20 wherein the gas stream is contacted with a sodium hydroxide solution to remove substantially all of the remaining chlorine.

30. A method of utilizing rare earth from an ore and removing chlorine from a gas stream containing the same comprising the steps of
  (a) oxidizing a pulverized bastnasite ore containing alkaline earth constituents, cerium compounds and other rare earth compounds,
  (b) leaching the ore from step (a) with an acid to solubilize the other rare earth compounds and produce a cerium residue of reduced alkaline earth concentration, (c) leaching residue from step (b) with concentrated hydrochloric acid to produce soluble cerium compounds and a gas stream containing chlorine, (d) contacting the gas stream from step (c) with ore from step (a) in the presence of water to produce a gas stream of substantially reduced chlorine content and an ore of reduced alkaline earth content, (e) recycling the ore of reduced alkaline earth content into step (b).

31. The method of claim 30 wherein the ore has a particle size of from about 5 to 25 microns.

32. The method of claim 31 wherein the gas stream is contacted with an aqueous slurry of the ore.

33. The method of claim 32 wherein the aqueous slurry comprises from 25 to 90 weight percent ore.

34. The method of claim 31 wherein the aqueous slurry comprises about 40 to 70 weight percent ore.

35. The method of claim 33 wherein the gas stream is contacted for a time sufficient to remove in excess of 80% of the chlorine.

36. The method of claim 30 wherein the time is within the range of from about 0.1 to 1.0 minute.

37. The method of claim 36 wherein the gas stream is subsequently contacted with a sodium hydroxide solution to remove substantially all of any remaining chlorine.

38. The method of claim 30 wherein in excess of 20 weight percent of the alkaline earth constituents are solubilized and leached from the ore in the slurry.

* * * * *